Dec. 8, 1964 W. L. MORRISON 3,160,307
INSULATED SHIPPER CONTAINER
Filed July 13, 1962 3 Sheets-Sheet 1
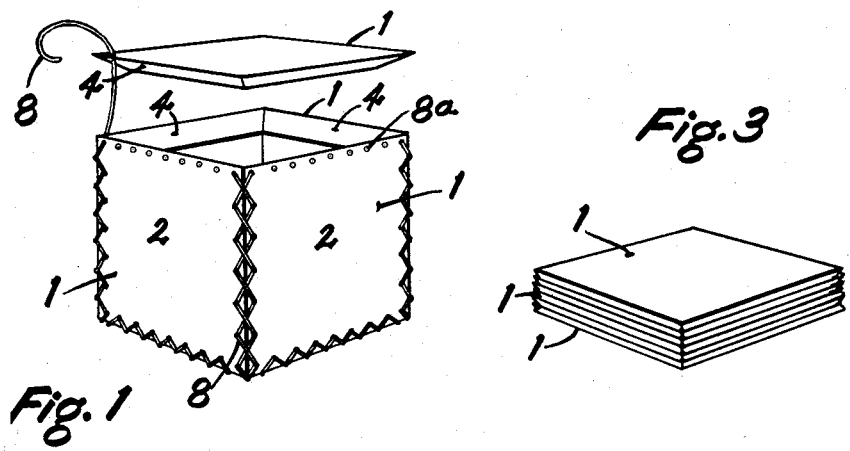
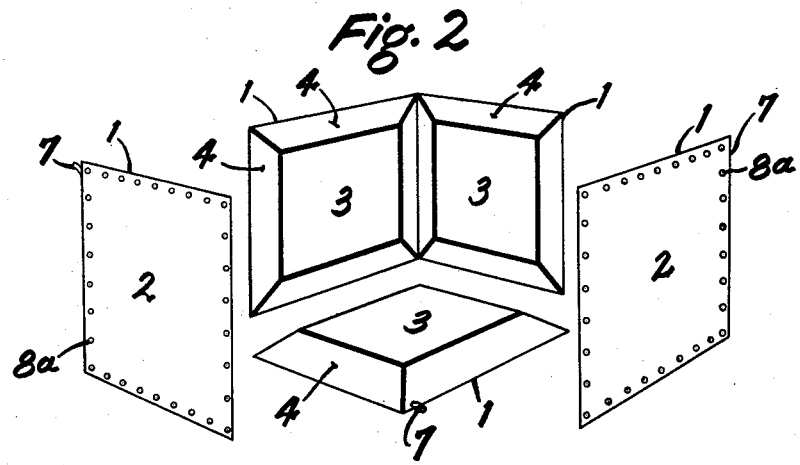
INVENTOR
WILLARD L. MORRISON

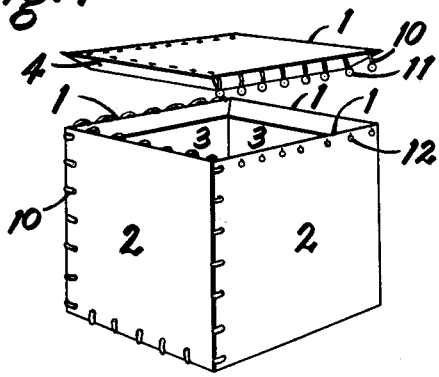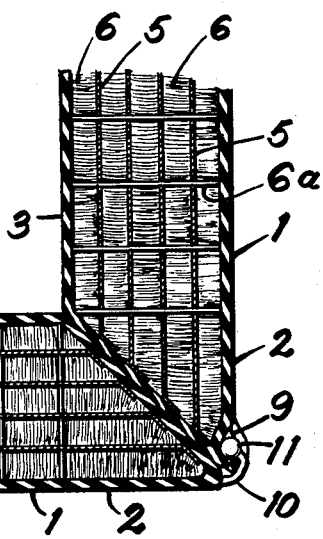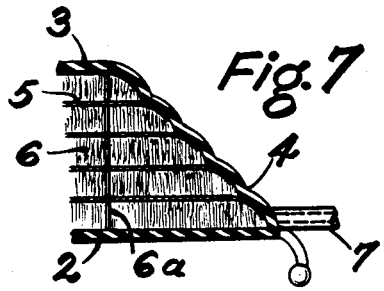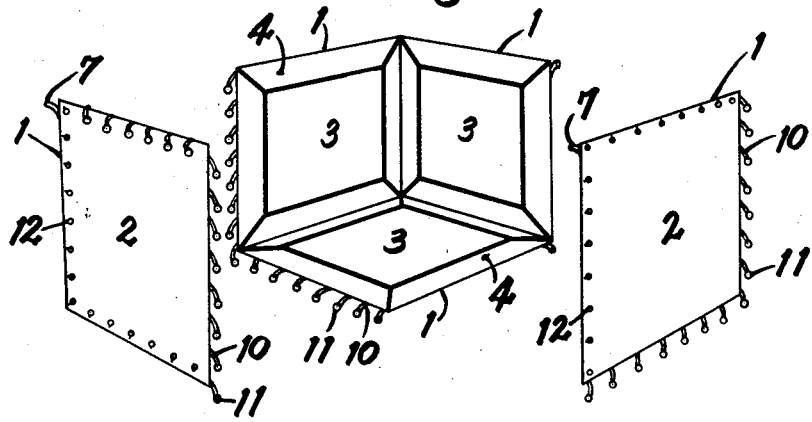

Dec. 8, 1964     W. L. MORRISON     3,160,307
INSULATED SHIPPER CONTAINER
Filed July 13, 1962     3 Sheets-Sheet 3
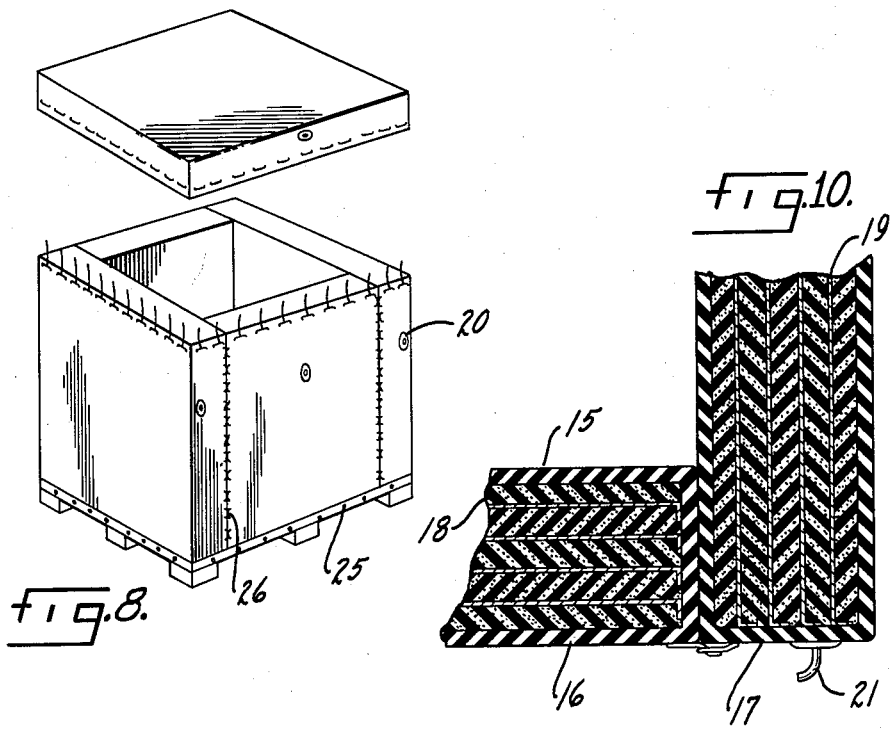
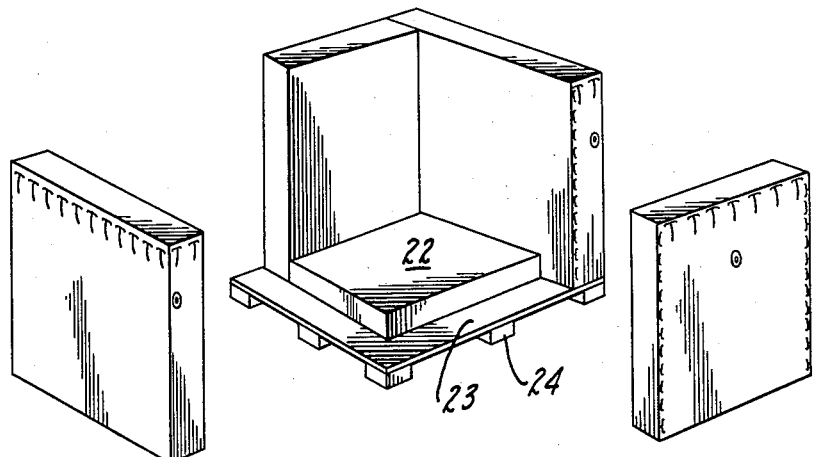
INVENTOR.
Willard L. Morrison,
BY Parker & Carter
Attorneys.

United States Patent Office 3,160,307
Patented Dec. 8, 1964

3,160,307
INSULATED SHIPPER CONTAINER
Willard L. Morrison, 470 King Muir Road,
Lake Forest, Ill.
Filed July 13, 1962, Ser. No. 209,550
6 Claims. (Cl. 220—9)

This invention relates to improvements in insulated shipper containers and has for one object to provide a shipper container for the shipment of frozen food and the like, the temperature of which has been lowered far below zero degrees F.

Another object of the invention is to provide a shipper container which may be disassembled and collapsed for return shipment.

Another object is to provide a shipper container which will cushion the contents and which will receive little if any damage from shocks or rough handling.

Another object is to provide a shipper container which may be easily assembled and disassembled by unskilled labor and which will be light, flexible and inexpensive.

Another object is to provide an insulating shipper container built up of a plurality of expandable, collapsible, air tight, insulating panels, removably attached in edge to edge engagement which by manipulation of air pressure therein may be collapsed for disassembly and shipment or may be expanded for use as an insulating shipper container.

This application is a continuation in part of co-pending application Serial No. 790,655, filed February 2, 1959 and now abandoned.

Shipper containers now available usually include an outer shell, an inner shell and fixed insulating material between the shells with a removable door through both shells and the insulation so that the container may be filled and emptied. Such containers are usually of metal and as a result are heavy and expensive and easily damaged especially in cargo handling from ship to dock and the like. A container insulated for long distance shipment of frozen food may for a six foot cube of frozen food require twelve inches of insulation so that the container itself is eight foot cube, which cube must be when unloaded, returned to destination.

This invention includes a demountable shipper container where for example a cubic mass of frozen food may be enclosed in a built up shipper container which includes six edge engaging insulating panels removably held together and so disposed that when destination has been reached the panels may be disconnected, stacked or baled one on top of another for return shipment, requiring greatly reduced space.

It is proposed also that each panel be separately inflatable and collapsible and the insulation within the panel include a fibrous material which expands and contracts so that for example a twelve inch thick panel when insulated may be much less than half that thickness when collapsed, thus again effecting a great reduction in the volume of return required for the panel.

In another form, the insulation within the panel may include inter-cellular foam like plastic rubber or elastomeric material which is adhered to the parallel walls and which has a memory so that after compression, when compression is released, the wall resumes its original shape and dimension.

When insulation of the type above referred to is used and air is extracted, atmospheric pressure compresses the fibrous material or the foam like plastic down to a much reduced thickness. When air is allowed to return to or is forced into the panel, it resumes its initial expanded shape whether the insulation is fibrous or foam like.

Each panel may well be a separate unit which can be separately inflated and deflated and when inflated has the same kind of load supporting strength characteristic of the conventional automobile tire and to get that strength only a very few pounds of inflation is needed.

Under ordinary circumstances when the panel is deflated for collapsed return shipment, with reduced cubage, the valve is closed to prevent entrance of air into the panel. When it is expanded or inflated for use as an insulating body, the valve is closed to prevent escape of air whether the pressure is atmospheric or above.

The invention is illustrated more or less diagrammatically in the accompanying drawing, wherein—

FIGURE 1 is a perspective of the shipper container with cover about to be applied;

FIGURE 2 is an exploded view of the shipper container of FIGURE 1;

FIGURE 3 shows the container collapsed and the panels piled for return shipment;

FIGURE 4 is a perspective view of a modified form of container;

FIGURE 5 is a section on an enlarged scale through a corner of FIGURE 4;

FIGURE 6 is an exploded view of the container of FIGURE 4;

FIGURE 7 is a section similar to FIGURE 5 through the edge of a single separate panel;

FIGURE 8 is a perspective modified form of shipper container with cover about to be applied;

FIGURE 9 is an exploded view of the shipper container of FIGURE 8;

FIGURE 10 is a section on an enlarged scale through a corner of FIGURE 8.

Like parts are indicated by like characters throughout the specification and drawings.

The shipper container preferably comprises six rectangular self-contained inflatable parallel walled flexible walled gas tight panels 1. These panels are removably fastened or laced together edge to edge to form a box as indicated in FIGURES 1 and 4. In using this device five of the panels deflated will be laced together as shown in FIGURE 1 or buttoned together as shown in FIGURE 4. Each panel will then be separately inflated. The container will be filled with packages of frozen food, the sixth panel will be laced or buttoned in place to close the container and will then be expanded. This puts the container in condition for shipment.

The inflation pressure in each panel or the expansion of the elastomeric filler after they are laced or buttoned together will expand them laterally edge to edge against one another to make gas and liquid tight joints, and will just like the inflation pressure in an automobile tire give the container adequate structural strength to support the load placed upon it in shipment or handling. A few pounds pressure inflating each separate panel or the expansion of the elastomeric filler makes the rectangular panels rigid and firm and causes them to take the form of self-supporting structural elements defining the container. When destination has been reached, the frozen food will be removed, the panels disassociated, being deflated before disassembly and then the collapsed panels thin and flat are baled up as indicated in FIGURE 3 for return shipment.

The rectangular panels 1 are identical and interchangeable. Each panel includes an outer wall 2, an inner wall 3 and inclined peripheral walls 4 joining the larger outer to the smaller inner wall. The inner and outer walls are parallel and concentric and when inflated, the peripheral walls are at approximately a forty-five degree angle respect to the inner and outer walls. All of the walls are rubberized or elastomeric impregnated flexible fabric, are strong, tough, and gas tight, the boundaries between the walls being equally gas tight.

Inside each panel are one or more foraminous partitions 5, parallel with the inner and outer walls and attached about their entire peripheries to the inclined walls. Cotton or other straight, preferably unspun fibers are attached at their opposite ends to the partitions and the walls respectively in such wise that when the panel is inflated, the fibers are under tension, are perpendicular to the walls and partitions and hold the outer walls in parallelism, the fibers so filling the interior of the panel that the cotton when expanded is in proper density for maximum insulation effect. Each panel is provided with a separate inflation and deflation valve 7 of the type used on modern foot and basket balls, the details of which are not illustrated as they form no part of the present invention.

The panels may be laced together by an elastic cord 8 passing around hooks or through eyelets 8a arranged along the edges of the outer wall, the cross cords passing around the hooks and around the edges of the panel where they meet forming a strong selvage to hold the edges together. Inflation takes place only after the edges of the outer walls have been laced or tied together and the inflation of the panels causes them, when expanded, to define a solid, self-supporting box structure.

In the modified form shown in FIGURES 4 and 5, instead of lacing and hooks, buttons and buttonholes are used. Two adjacent edges of each outer panel wall are provided with a series of spaced pockets 9. The other two edges of each outer wall are provided with flexible rope slings 10 which terminate in buttons 11 which can be inserted in the buttonholes 12 in the outer wall to enter the pockets 9 to hold the edges together. Since the panels are all identical, they can be assembled as shown in FIGURE 6 with the button edge of one panel adjacent the buttonhole edge of another.

The lateral displacement of the inclined walls 4 in a direction parallel with the inner and outer walls is limited by the partitions 5. This maintains these inclined walls generally at the forty-five degree angle but since there is space between the partitions, the inclined walls are free to bulge outwardly slightly between the anchorages of the partition walls against one another. Thus the inflation of the two panels insures a tight joint between the opposite inclined walls 4.

In the modified form shown in FIGURES 8, 9 and 10, each panel has inner and outer walls 15, 16 joined by peripheral walls 17 perpendicular to the walls 15 and 16. The space between these walls is filled with an elastomeric rubber-like intercellular foam material 18 which may be compressed but which in its normal position fills the space between the walls and holds them in parallelism, being preferably but not necessarily adhered to those walls. The foamed, compressible and expandable insulating material 18 is divided into a plurality of separate layers by tension sheets 19 which may be of fabric, paper, plastic or any other suitable material disposed parallel to the inner and outer walls. The tension members may or may not be adhered to the peripheral walls 17 and are preferably especially if adhered to the walls, sufficiently pervious to permit air passage therethrough. Because the filler is intercellular, air can be extracted from or allowed to enter int othe air tight chamber defined by the walls through the valve opening 20 associated with a removable cap 21.

In the form shown in FIGURES 1 to 7 inclusive, the six panels are identical. In the form shown in FIGURES 8 to 10 inclusive the bottom may well comprise a load supporting panel 22, resting on a pallet 23, skidded at 24 with the upstanding panels permanently attached as at 25 but hooked together and removably hooked to the roof panel by the hooks 26. When the upstanding panels are permanently attached, they can be unhooked, collapsed by extracting air therefrom and folded down one on top of the other above the panel 22 onto the panel 23 so as to get the reduced cubage for return shipment which is an important factor in the present invention.

Each panel abuts on its adjacent panel and the panels are held together by releasable hooks and eyes 20 joining their edges.

Since each panel is a self-contained unit and is separately inflated, shock to one panel is not reflected in any change in the other panels and each panel is therefore its own self-contained shock absorber. This is especially important in connection with over seas shipment because this pneumatic insulated type of shipper container serves as a cushion and will absorb even the heaviest blows resulting from hitting the side of the ship or dropping on the deck without permanent distortion, warping or damage to the container.

Another advantage of the separate inflation is that if one of the panels should be punctured or lose its air, the remaining panels being laced to it, will hold the outer wall away from the inner wall, thus minimizing loss of insulation.

This invention has been illustrated as a cubic box and this makes it possible for the separate panels to be identical nad interchangeable. The same principle may be used with boxes of other shape or with panels not identical. Some of the panels might be edge to edge in the same plane instead of being at right angles to one another. Under these circumstances, the mating edges or edge walls would be perpendicular rather than inclined but as a general proposition a rectangular cube is considered better, is easier to assemble and generally more effective.

While under some circumstances the fibers themselves are sufficient to maintain the inner and outer walls in parallelism, separate tension members 6a may also be used which reinforce and protect the structure against excessive tensions on the thin fibers.

FIGURE 7 illustrates the outward bulging of the inclined walls toward one another when the panels are under inflation. The panels are of the type disclosed in my Patent No. 2,859,489.

Each insulating panel is a self-contained unit. By manipulation of the air pressure therein, each unit may be expanded for use with the edges of the panels in edge to edge engagement by removable means to define an insulated shipper container or by reduction of pressure, they may be collapsed, the edge to edge engagement released and the panels may be folded or piled one on the other to define a reduced volume package for return shipment. If the fibrous insulation shown is used, the pressure in each panel must be maintained at least at atmospheric to hold the panel walls spaced apart and perhaps at somewhat more than atmospheric to put tension on the tension members. If the panel is filled with intercellular, foamed material having a memory, the original size of the material bieng such as to completely fill the space between the panel walls and expand the panel, then air pressure even at atmospheric may be sufficient though preferably in each case a slightly above atmospheric pressure is desirable. The important thing is that both types of wall or wall panel are expandable and contractable, are removably connected so that when expanded to form a shipper container ready for use containing food and when disconnected and the walls are contracted they may be assembled one on top of the other for return shipment in small cubage. The sole structural elements are those elements which provide the insulation, no additional frame or structure being needed. Thus no additional frame or structure is there to add weight and take up space and increase the cost of shipment.

When the panel containing with air either fibrous or porous sponge-like insulating material is at its maximum expanded condition, giving maximum insulation and the valve is closed holding air therein, it will resist—since the walls are held in parallelism—substantial pressure. However, local impacts, local pressures may cause inward bending of the outer wall which would reduce the thickness of effective insulation at that point. Such bending is resisted by the tension sheets contained within each panel, interposed between the various layers of insulating material. Local pressure tends to bend the outer wall and successive sheets inwardly and is resisted by the sheets in resilient shear whether they are attached at their peripheries to the peripheral wall or not. The sheets adhere to the insulating material and the insulating material and the contained air thus assist in resisting movement of the sheets along paths perpendicular to the inner and outer walls and resist local penetration of the insulating body.

I claim:

1. An insulating shipper container comprising a plurality of separate inflated wall panels abutting edge to edge to define an insulating chamber, each panel including elastomeric inner and outer walls, peripheral walls joining them to define in each panel an air tight pressure chamber, tension members in each panel, some generally perpendicular to the inner and outer walls holding them in general parallelism, under inflation, others generally parallel to said walls, limiting the outer displacement of the peripheral walls under inflation, removable means associated with the outer walls only to hold the panels in edge to edge abutment with the peripheral wall of one panel forced by inflation against an adjacent panel to make a tight seal, the inflation of each wall panel exerting a pressure on the removable holding means to lock the wall panels in firm assembled position.

2. An insulating shipper container comprising a plurality of separate inflated wall panels abutting edge to edge to define an insulating chamber, each panel including elastomeric inner and outer walls, peripheral walls joining them to define in each panel an air tight pressure chamber, tension members in each panel, some generally perpendicular to the inner and outer walls holding them in general parallelism, under inflation, others generally parallel to said walls, limiting the outer displacement of the peripheral walls under inflation, removable means associated with the outer walls only to hold the panels in edge to edge abutment with the peripheral wall of one panel forced by inflation against an adjacent panel to make a tight seal, the inflation of each wall panel exerting a pressure on the removable holding means to lock the wall panels in firm assembled position,
the tension members parallel with the outer walls being spaced apart, the peripheral walls bulging outwardly between such tension members under inflation.

3. An insulating shipper container comprising a plurality of separate inflated wall panels abutting edge to edge to define an insulating chamber, each panel including elastomeric inner and outer walls, peripheral walls joining them to define in each panel an air tight pressure chamber, tension members in each panel, some generally perpendicular to the inner and outer walls holding them in general parallelism, under inflation, others generally parallel to said walls, limiting the outer displacement of the peripheral walls under inflation, removable means associated with the outer walls only to hold the panels in edge to edge abutment with the peripheral wall of one panel forced by inflation against an adjacent panel to make a tight seal, the inflation of each wall panel exerting a pressure on the removable holding means to lock the wall panels in firm assembled position,
the tension members parallel with the outer walls being spaced apart, the peripheral walls bulging outwardly between such tension members under inflation,
the tension members comprising foraminous partitions attached about their outer periphery to the peripheral walls.

4. An insulating shipper container comprising a plurality of separate inflated wall panels abutting edge to edge to define an insulating chamber, each panel including elastomeric inner and outer walls, peripheral walls joining them to define in each panel an air tight pressure chamber, tension members in each panel, some generally perpendicular to the inner and outer walls holding them in general parallelism, under inflation, others generally parallel to said walls, limiting the outer displacement of the peripheral walls under inflation, removable means associated with the outer walls only to hold the panels in edge to edge abutment with the peripheral wall of one panel forced by inflation against an adjacent panel to make a tight seal, the inflation of each wall panel exerting a pressure on the removable holding means to lock the wall panels in firm assembled position,
the tension members perpendicular to the inner and outer walls including unspun insulating filaments between and perpendicular to said walls anchored at each end and placed under tension by inflation.

5. An insulating shipper container comprising a plurality of separate inflated wall panels abutting edge to edge to define an insulating chamber, each panel including elastomeric inner and outer walls, peripheral walls joining them to define in each panel an air tight pressure chamber, tension members in each panel, some generally perpendicular to the inner and outer walls holding them in general parallelism, under inflation, others generally parallel to said walls, limiting the outer displacement of the peripheral walls under inflation, removable means associated with the outer walls only to hold the panels in edge to edge abutment with the peripheral wall of one panel forced by inflation against an adjacent panel to make a tight seal, the inflation of each wall panel exerting a pressure on the removable holding means to lock the wall panels in firm assembled position,
the tension members parallel with the outer walls being spaced apart, the peripheral walls bulging outwardly between such tension members under inflation,
the tension members comprising foraminous partitions attached about their outer periphery to the peripheral walls,
the tension members perpendicular to the inner and outer walls including unspun insulating filaments between and perpendicular to said walls anchored at each end and placed under tension by inflation.

6. An insulating shipper container comprising a plurality of separate inflated wall panels abutting edge to edge to define an insulating chamber, each panel including elastomeric inner and outer walls, peripheral walls joining them to define in each panel an air tight pressure chamber, tension members in each panel, some generally perpendicular to the inner and outer walls holding them in general parallelism, under inflation, others generally parallel to said walls, limiting the outer displacement of the peripheral walls under inflation, removable means associated with the outer walls only to hold the panels in edge to edge abutment with the peripheral wall of one panel forced by inflation against an adjacent panel to make a tight seal, the inflation of each wall panel exerting a pressure on the removable holding means to lock the wall panels in firm, assembled position,
the peripheral walls being maintained by the tension members parallel to the side walls in substantially a forty-five degree inclination with respect to said walls.

References Cited in the file of this patent

UNITED STATES PATENTS

| | | |
|---|---|---|
| 2,663,448 | Spiegelhalter | Dec. 22, 1953 |
| 2,841,306 | Vitoux | July 1, 1958 |
| 2,844,178 | Coleman | July 22, 1958 |
| 2,859,489 | Morrison | Nov. 11, 1958 |
| 2,913,029 | Paton | Nov. 17, 1959 |